United States Patent [19]

Hoover et al.

[11] 4,032,454

[45] June 28, 1977

[54] PERMSELECTIVE MEMBRANE APPARATUS WITH POROUS SUPPORT

[75] Inventors: Fred Wayne Hoover, Wilmington, Del.; Robert Earl Roberts, Kennet Square, Pa.

[73] Assignee: E. I. Du Pont de Nemours and Company, Wilmington, Del.

[22] Filed: Mar. 31, 1972

[21] Appl. No.: 240,260

[52] U.S. Cl. .................... 210/323 R; 210/433 M; 210/490; 210/496

[51] Int. Cl.² ........................................ B01D 31/00

[58] Field of Search .......... 210/496, 490, 433, 321, 210/500, 23, 323 R; 55/158

[56] References Cited

UNITED STATES PATENTS

| | | | |
|---|---|---|---|
| 3,338,681 | 8/1967 | Kordesch | 55/158 X |
| 3,457,170 | 7/1969 | Havens | 210/490 X |
| 3,544,358 | 12/1970 | Manjikian | 210/321 |
| 3,598,241 | 8/1971 | Vondracek et al. | 210/321 |
| 3,608,730 | 9/1971 | Blaha | 210/433 X |
| 3,610,418 | 10/1971 | Calderwood | 210/336 X |
| 3,712,473 | 1/1973 | Ellenburg | 210/321 |

*Primary Examiner*—Frank A. Spear, Jr.

[57] ABSTRACT

An apparatus useful for the separation of the components of fluid mixtures by means of pressure and a permselective membrane, applicable to reverse osmosis, ultrafiltration, electrofiltration, and gaseous separation processes, comprises a shell, containing a porous body with multiple passages therethrough, with a selectively permeable membrane supported by at least a portion of the surfaces of the passages and a coating of either a semipermeable or a non-permeable material on all other surfaces except for areas left uncoated for egress of fluids from the porous body, means for passing a fluid mixture into contact with the surfaces of the body under pressure, and a conduit in fluid-tight relation to the membrane for removing fluids passing through the membrane from the porous body. Such an apparatus can be operated at high pressure because of the compressive stress exerted on the porous body when the shell is pressurized, and permits for advantageous ratios of membrane surface area to body volume.

10 Claims, 3 Drawing Figures

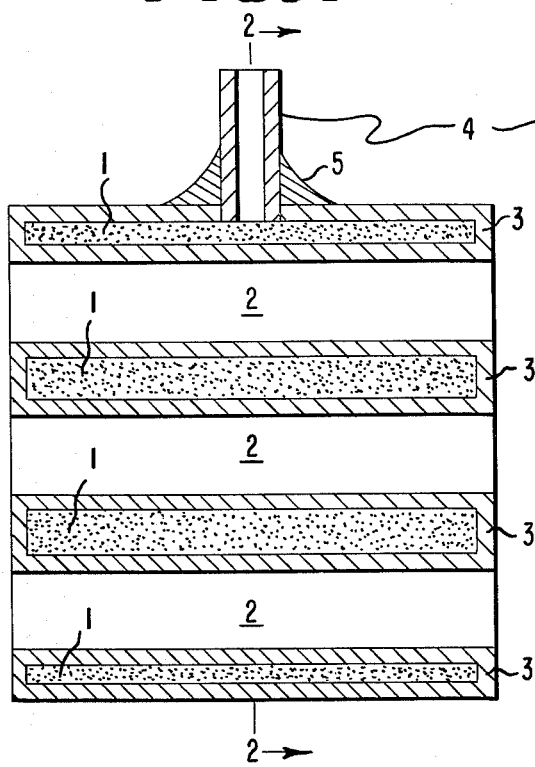
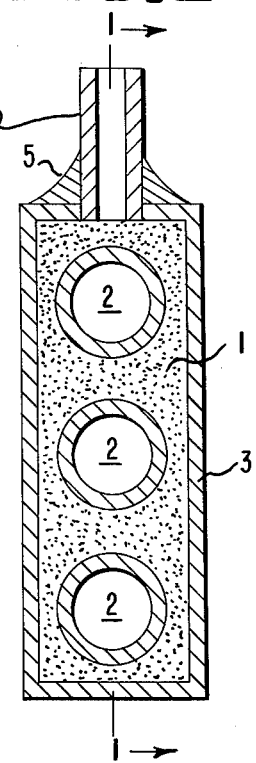
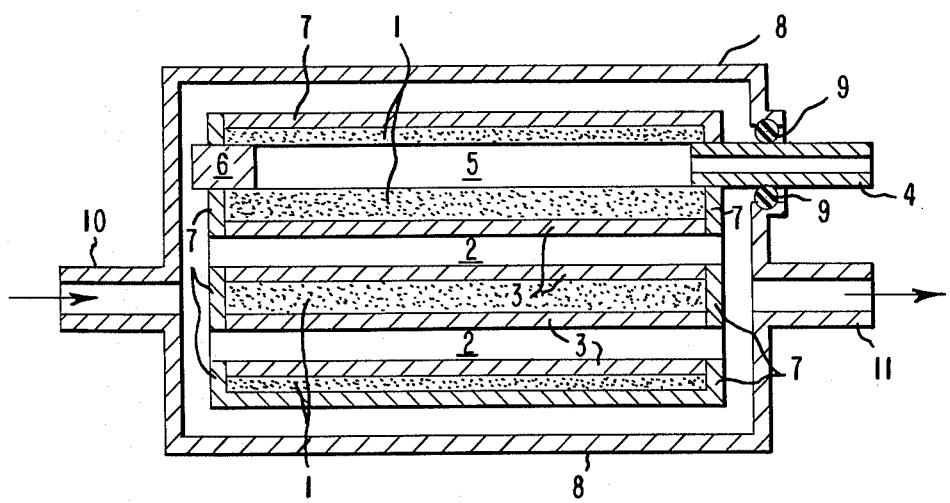

PERMSELECTIVE MEMBRANE APPARATUS WITH POROUS SUPPORT

BACKGROUND OF THE INVENTION

1. Field of the Invention

This invention pertains to apparatus for the separation of the components of fluid mixtures employing permselective membranes. More particularly, this invention is directed to apparatus useful in reverse osmosis, ultratiltration, electrofiltration, and gaseous separation processes, said apparatus featuring a porous body as membrane support and a pressure-tight shell encasing the body and membrane with means for feeding to and withdrawing from the interior of the shell.

The components of fluid mixtures are separated in this apparatus by means of a membrane selectively more permeable to some components of the mixture than to other components by bringing the mixture into contact with the membrane under pressure. The components which pass through the membrane and a mixture depleted in these components are then collected from the two sides of the membrane.

2. Prior Art

Many different forms of apparatus have been designed for separating the components of fluid mixtures by means of pressure and a selectively permeable membrane. All contain a suitable membrane, means for introducing a feed mixture to be separated, means for contacting this mixture with one surface of the membrane, means for maintaining the feed mixture under pressure, means for removing a mixture depleted in the more permeable components from the contacted surface of the membrane, and means for recovering the more permeable components which pass through the membrane.

In such apparatus, the rate at which the more permeable components of the feed mixture passes through the membrane is directly related to the permeability of the membrane for these components, the area of the membrane, and the effective operating pressure. Improvements in membrane permeability, in membrane area per unit volume, and in the tolerance for higher operating pressures and temperatures have been sought in various ways. For example, increased membrane permeability has been obtained through the use of thin membranes formed on, adherent to, and partially integral with porous supports.

In apparatus employing membranes supported by porous structures, greater efficiency at a given operating pressure can generally be obtained by increasing the permeability of the support material. However, increased permeability is usually accompanied by some reduction in strength. Efficiency at a given operating pressure can also be increased by reducing the length of the permeate flow path through the porous structure, such as by use of thin porous structures.

The porous supports for selectively permeable membranes, and particularly tubular, plate-like, and odd-shaped supports, have been used in many combinations and permutations in various devices. Such as those disclosed in U.S. Pat. No. 3,156,654 and U.S. Pat. No. 3,400,825.

A more recent device is shown in U.S. Pat. No. 3,598,241 which describes a body of a porous material with multiple passages therethrough and with membranes on the surfaces of the passages. This body is connected to means for introducing a feed solution into the passages and for removing a concentrated solution from the passages. A trough provides a means for collecting liquids passing through the membrane and dripping from the outsides of the porous body. Such a device requires that the porous body be relatively thick in smallest section to withstand the high pressures which are desirable in separations involving permselective membranes. The necessity for thick sections will limit the practical amount of membrane surface per unit volume in separation apparatus incorporating this concept, and lead to more weight of porous material and larger apparatus which in turn leads to higher cost than would be required with better membrane area to unit volume ratios.

It is an object of this invention to provide a separatory device having a high ratio of membrane area to device volume in which the membrane is supported by a porous body. It is a further object of this invention to provide such a device capable of operating at high pressure. These and other objects are obtained by this invention as described and illustrated hereinafter.

SUMMARY OF THE INVENTION

In summary, this invention is directed to an apparatus for separating the components of a fluid mixture by means of pressure and a permselective membrane, which apparatus comprises
  a fluid-tight shell having
    a fluid feed inlet,
    a fluid concentrate outlet, and
    a permeate outlet,
    and containing at least one element spaced away from the interior surface of the shell, said element comprising
      a body
        of porous material
        with multiple passages therethrough,
      a membrane
        selectively permeable to the components of the fluid mixture and supported by at least a portion of the surface of the passages,
      a conduit
        in fluid communication with the porous body and the permeate outlet and in fluid-tight relation to the membrane, and
      a non-permeable coating
        on all surfaces of the porous body not supporting the membrane or providing fluid communication between the porous body and the conduit.

This invention also encompasses this element in which the porous body is an array of porous modules in parallel or series arrangement, connected in fluid-tight relationship at the surfaces of the array and having porosity throughout for fluid flow.

This invention provides efficient and inexpensive apparatus through its use of low-cost support materials arranged to provide large membrane areas in small volumes useful under high pressures. These advantages result from 1. elimination of practically all tensile stresses in the porous body, thereby making practical the use of increased operating pressures with membrane support materials having relatively low strengths;
2. the use of low-cost support structures with thin porous portions and multiple small passages therethrough, making practical large membrane areas per unit volume;

3. the use of low-cost cylindrical pipes as enclosing pressure vessels and of arrays of elements in series inside such pipes;
4. the use of porous support structures having short flow paths between membrane surfaces and conduits for removing therefrom fluids which pass through the membranes; and
5. the elimination of some of the expensive mechanical sealing arrangements in installing membrane-coated elements inside pressure vessels and in installing multiple elements inside a single vessel.

BRIEF DESCRIPTION OF THE DRAWINGS

This invention will be better understood by reference to the drawings, in which

FIG. 1 is a longitudinal section of an element of the invention along line 1—1 in FIG. 2 and shown without a shell;

FIG. 2 is a cross-section of the apparatus of FIG. 1 along the line 2—2 in FIG. 1 and shown without a shell; and FIG. 3 is a longitudinal section of an apparatus employing an alternate form of the element of FIG. 1.

DISCUSSION OF THE INVENTION

In particular, FIGS. 1 and 2 are longitudinal and cross-sections of an element of this invention shown without a shell and comprising a porous body 1 containing a multiplicity of passages 2 therethrough and having a membrane 3 supported by the exterior surfaces of the porous body 1 and the interior surfaces of the passages 2. Conduit 4 is attached to the porous body 1 in fluid communication with the porous body 1 and in fluid-tight relation to the membrane 3 through optional sealing means 5, providing means for removing fluid from the porous body 1.

FIG. 3 shows in longitudinal section an alternate form of the element of FIG. 1 in which a unitary porous body 1 contains passages 2, each supporting on its interior surfaces a membrane 3. Conduit 4 is sealed into a passage 5 extending into the body 1 and closed at the opposite end from the conduit 4 with a plug 6. Sealing material 7 (which can be a membrane the same as or different from membrane 3) on the exterior surfaces of the porous body 1 not supporting membranes or on the surfaces in fluid communication with conduit 4 makes fluid-tight the relations between the body 1, the membrane 3, the conduit 4, and the plug 6. In FIG. 3 this alternate element form is encased in a shell 8 which is fitted with a gasketed opening 9, thereby providing a fluid-tight seal between the shell 8 and the conduit 4. Shell 8 has inlet and outlet conduits 10 and 11 which provide means for introducing a fluid mixture under pressure into the shell 8, passing the mixture through passages 2 and into contact with the membrane 3 and for removing a more concentrated fluid mixture from the shell 8. Components of the fluid mixture passing through the membrane can be removed from the porous body 1 through the conduit 4.

The body of porous material of the elements of this invention can be of any composition with adequate strength for supporting a membrane under pressure and appropriate continuous porosity throughout for providing passages for fluid flow of the portion of the applied mixture which passes through the membrane. For example, the porous body can be made of porous carbon, bonded fibers, sintered or otherwise porous metal, sintered thermoplastic material, sintered refractory material, or adhesively bonded particulate material. Preferred materials for the porous body are bonded particulate materials like epoxy resin bonded sand and the like and fired unglazed ceramic compositions.

The porous body can be of any desired shape. Preferred shapes are cylindrical for convenient installation in conventional pipes and rectangular or hexagonal for efficient grouping in parallel arrangements.

The passages in a porous body in the apparatus elements of this invention must extend through the body in order to provide for introduction of a fluid at one end and for removal at the other end of a fluid containing reduced amounts of components selectively passing through the membrane.

The passages through the porous body must be multiple in number to provide a relatively large membrane surface area per unit volume. Their number, size, and shape are jointly limited by the ease of fabrication of porous bodies containing multiple passages and by the strengths of such bodies made of practical materials.

The passages through the porous body are preferably longitudinal in that they extend through the body in substantially straight paths in contrast to tortuous paths. Such longitudinal passages simplify and make more practical the formation of the passage-containing porous body and also the formation or installation of suitable permselective membranes on their surfaces.

The passages through the porous body can be of any shape chosen for convenient and economical fabrication and for effective membrane formation and support. Passages with cross-sectional shapes which are circular or of polygonal shapes nearing circular (e.g. hexagonal) are useful. Preferred are passages with polygonal cross-sections, such as triangular, rectangular, hexagonal, etc., which are of such regular shapes and sizes that they can be arrayed with substantially uniform spacing from the corresponding surfaces of adjacent passages. Passages with such shapes inside porous bodies of the same shape make particularly practical the use of walls of minimum and uniform thickness between the passages and between the outermost passages and the exterior surfaces of the porous body and thus provide the advantages of this invention to a maximum degree.

The passages through the porous body are preferably of a size providing efficient contact between the membrane upon their surfaces and the fluid mixture in contact therewith and of a size suitable for the formation or installation of a suitable membrane thereon. Passages as small as about 0.02 inches or smaller and as large as 1 inch or more in diameter are useful. Such passages can be separated by porous material of a thickness between about 0.005 and 0.5 or more inches. Particularly economical and efficient elements of the type described herein have porous bodies of an extruded ceramic or resin-bonded composition containing passages between about 0.06 and 0.4 inches in largest cross-section separated by porous material with a thickness between about 0.01 and 0.1 inches. Such bodies can be, for example, between about 5 inches and about 5 feet in either length or diameter.

For example, potentially low-cost porous ceramic bodies particularly suitable for use in the apparatus of this invention are obtained by extruding a suitable mixture containing particulate silica and glass with water through a substantially hexagonal die having a diameter of about 3 inches and containing inserts which form in the resulting extruded shape 37 evenly spaced cylindrical passageways each about 0.3 inch in diameter. The extruded shape is then air dried and fired at about 900° C. Such a support about 2 feet long provides a potential membrane support area of about 6 square feet within the passages and about 1.66 square feet on the outside surface and thereby provides about 65 square feet of membrane surface per cubic foot of body volume.

The porous body membrane support in the elements described herein can be assemblies of modules, each having multiple passages therethrough, in parallel array and bonded together at their abutting surfaces with a suitable porous cement. Such modules can be of any cross-sectional shape which can be assembled in close-packed array such that the surfaces of each module in the array can abut similar surfaces of other modules. Preferably, for economy and for convenience in assembly, all the modules in any array are of the same shape and size. For example, modules can be of equilateral triangular, rectangular, or regular hexagonal cross-section. Modules of regular hexagonal cross-section are preferred since they can be assembled conveniently into arrays which approach circular cross-section.

One particularly preferred array is that in which an element formed of a collection of hexagonal porous multi-passaged modules in parallel array are attached together at their abutting surfaces by a porous cement, with their exterior surfaces covered by a non-permeable or membrane coating, having membranes on the surfaces of the passages, and having attached a conduit for removing fluids passing through the membranes.

The membrane selectively permeable to components of a fluid mixture can be of any composition or structure known in the art. For example, it can be a thin structure adherent to the porous body. Such an adherent membrane can be formed by coating the surfaces of the porous body with a suitable solution or suspension of a membrane-forming material and completing the conversion of the material into a perm-selective membrane as is known in the art. Such a membrane for use in reverse osmosis or ultrafiltration processes can be of an inorganic composition, of an organo-inorganic composition, or of an organic composition. For example, it can be of a cellulose ester or ether, an acrylic, protein, amide, urea, or melamine-formaldehyde resin, a polyvinyl alcohol, or an inorganic oxide composition.

Such a selectively permeable membrane must be supported by at least a portion of the surfaces of the passages through the porous body in order to assure the advantages of this invention but can be supported optionally by other surfaces. For example, it can be supported by the exterior surfaces other than those which provide fluid communication between the membrane and the conduit. Adherent membranes are preferably formed on and supported by all surfaces other than those providing fluid communication with the conduit.

One composition particularly suitable for use in forming an adherent reverse osmosis membrane contains cellulose acetate 25%, formamide 30%, and acetone 45%, all amounts by weight. A layer of this composition can be applied to the surfaces of the porous body, such as by dipping the body in the composition after attaching a conduit, and then allowed to dry at room temperature for about 1 minute. The resulting film is leached with cold water for about 2 hours and then is heated in water at about 80° C. for about 5 minutes, thereby forming an adherent cellulose acetate membrane with salt rejection properties under reverse osmosis conditions.

Alternatively, the membrane can be a separate structure formed independently of the porous body and applied thereto so as to be supported thereby. For example, tubular membranes of appropriate size can be made as described in the art, inserted into passages in a porous body, and sealed in fluid-tight relation to a conduit in fluid communication with the porous body. Such tubular membranes can be made of various compositions and by techniques known in the art. For example, they can be of the compositions and type described by Richter and Hoehn in U.S. Pat. No. 3,567,632. One composition particularly useful in making such tubular membranes is a poly(amide-hydrazide) prepared by condensing a mixture of 80 parts of 3-aminobenzhydrazide and 20 parts of 4-aminobenzhydrazide with a stoichiometrically equivalent amount of a mixture of 70 parts of iso-phthaloyl chloride and 30 parts of tere-phthaloyl chloride. Tubular membranes can be prepared of such compositions by techniques such as those described by Loeb et al. in U.S. Pat. No. 3,446,359. They can be installed in the passages of the porous body with suitable cements and sealing devices as is known in the art.

The conduit in fluid communication with the porous body and in fluid-tight relation to the membrane provides a means for withdrawing fluid from the body and can be a non-pervious tube opening onto a portion of the surface of the porous body and fastened to the body by any suitable means. For example, the conduit can be fastened to the body with a cement or a threaded fitting.

The conduit is preferably in fluid communication with only a small portion of the surface of the porous body so that substantially all the surface of the body is under compressive stress when the shell is pressurized. Preferably, the conduit abuts the porous body at an open end so that the only portion of the surface of the body not under pressure is the small area corresponding to the cross-sectional area of the conduit. In another embodiment of the invention, the conduit is fastened into a passage in the body, which passage is open to receive fluid from the pores of the body. In such embodiments the conduit and the passage into which the conduit is fastened are preferably of small diameter, e.g. less than 0.25 inch in diameter, in order to take advantage of the well-known resistance of small tubes to collapse by compressive forces.

Still another embodiment of the invention is one in which a strap carrying a coupling to which a conduit is sealingly engaged is made fluid-tight with respect to a cylindrical porous body and a membrane with a non-pervious cement.

The conduit must be in fluid-tight relation to the membrane in order to avoid contamination of the permeate passing through the membrane with the feed mixture. Preferably, the conduit is made fluid-tight to the membrane by the membrane itself. Optionally, the membrane can be sealed to the conduit by any other suitable technique. For instance, an epoxy resin can seal the membrane to the conduit and also bond the edges of the membrane to the porous body.

The apparatus of this invention includes a non-permeable coating on all surfaces of the porous body not supporting a membrane or providing fluid communication between the porous body and a conduit, which coating provides a fluid-tight relation between the membrane and the conduit. This coating can be of any suitable material adherent to the porous body, the membrane, and the conduit. An often used material is an epoxy resin. This coating can be on the outer surfaces of the body and on any surfaces of the passages through the body which do not support membranes. It can, for example, seal tubular membranes into cylindrical passageways in a cylindrical porous body and be on the end and outer surfaces of the body except for the area to which a conduit is attached.

The elements described herein are parts of apparatus in which one or more of them is inside and spaced away from a shell, with the conduit for removing fluid from the porous body passing in sealed relation through the shell and with means for introducing a fluid mixture under pressure into the shell and for removing a fluid mixture from the shell. The shell can be made of metal, plastic, or any other suitable material capable of withstanding the required operating pressure. Cylindrical metallic and plastic pipes with end plates attached in conventional ways are preferred shells because of their low cost, strength, and efficient shapes. The shell can be spaced apart from the porous body by any suitable spacing means such as protrusions on the outside surfaces of the body or on the inside surfaces of the shell. Preferably such spacing means leave the porous body free to move with respect to the shell so that the body and the shell are independently affected by changes in pressure and temperature.

The means for introducing a fluid mixture under pressure into and for removing a fluid mixture from the shell can be conduits opening into spaces within the shell. Preferably, such conduits open near the ends of the passageways through the porous body and are arranged, optionally in cooperation with other structures, so as to direct the flow of the mixture to be separated uniformly over the membrane-supporting surfaces of the porous body, including particularly the membrane-supporting surfaces of the passages through the body.

Optionally, such an apparatus can contain more than one element in parallel or serial array inside a single shell. For example, a series of elements can be arrayed so that streams of fluid pass through corresponding passages in sequential elements or so that the streams of fluid emerging from the passages in each element are mixed together before being subdivided for passage through the next element in the sequence.

The following example illustrates this invention.

EXAMPLE

A porous ceramic cylinder, 4 inches in diameter and 10 inches long and made of a silica composition bonded with a phenolic resin (coded QR-10) was obtained from the Filtros Division of the Ferro Corporation. Nineteen holes, each cylindrical and 0.5 inch in diameter, were bored longitudinally in this cylinder, with approximately the same spacing between each of the holes and nearby holes and also between the outermost holes and the outside of the cylinder, there being a hole in the center, 6 holes in an inner circle, and 12 holes in an outer circle.

A perforated metal tube was sealed into the center hole with an epoxy resin. One end of this tube, extending about one inch from the cylinder, was plugged. The other end, extending about 6 inches from the cylinder, was left open. The outside surfaces of the cylinder, including the ends of the cylinder and the walls of the remaining 18 holes through the cylinder for a distance about 0.75 inch from their ends, were made non-permeable with a thin coating of an epoxy resin. The holes through the cylinder were then lined with preformed tubular reverse osmosis membranes made of a poly(amide-hydrazide) resin prepared by condensing a mixture of 80 parts of 4-aminobenzhydrazide with a stoichiometrically equivalent amount of a mixture of 70 parts of iso-phthaloyl chloride and 30 parts of terephthaloyl chloride by procedures of the type described by Richter and Hoehn in U.S. Pat. No. 3,567,632 and then wrapped with nylon taffeta. These membranes were sealed into the holes at each of their ends by means of grommets which were held tightly in place by metal plates secured to the perforated tube at each end of the cylinder. These plates contained 5/16 inch holes directly over the open ends of the tubular membranes to permit easy flow of fluid through these open ends and into contact with the inner surfaces of the membranes.

The ceramic cylinder, so outfitted with permselective membranes and a conduit for egress of material passing through these membranes, was placed inside a cylindrical metal shell having an internal diameter of about 4.25 inches and a tube attached on the side near one end, with the tube from the central hole in the ceramic cylinder extending from the end of the shell nearer the side tube. Gasketed end plates were installed in the shell, with the central tube of the cylinder passing through and mechanically sealed into the end plate nearer the side tube and with a tube attached to the end plate nearer the side tube and with a tube attached to the end plate farther from the side tube of the shell. The resulting device was connected to a liquid recirculation system in such a way that liquid entered the tube at the end of the shell farther from the side tube and passed both (1) through the open ends of the membranes and into contact with their inner surfaces and (2) around the outside of the ceramic cylinder before exiting through the side tube of the shell. The liquid thus passed through the membrane-lined passageways in the porous ceramic cylinder and also around the outside of this cylinder. Provision was also made for collecting material passing through the tubular membranes, through the porous ceramic cylinder, and out the central tube.

With an aqueous solution containing 0.5 percent sodium chloride passing through this device as described at a rate of 5 gallons per minute at 21° C. and at a pressure of 600 pounds per square inch, water passed through the membranes for three days at a rate of 5 to 9 gallons per square foot per day with a salt rejection of about 95 percent. After disassembly of the device, the ceramic cylinder showed no sign of failure due to exposure to high pressure.

The embodiments of the invention in which an exclusive property or privilege is claimed are defined as follows:

1. Apparatus for separating the components of a fluid mixture by means of pressure and a permselective membrane, which apparatus comprises
   a fluid-tight shell having
      a fluid feed inlet,
      a fluid concentrate outlet, and
      a permeate outlet,
      and containing at least one element spaced away from the interior surface of the shell, said element comprising
         a body of porous material
with multiple passages therethrough,
a membrane
selectively permeable to the components of the fluid mixture and supported by at least a portion of the surface of the passages,
a conduit
in fluid communication with the porous body and the permeate outlet and in fluid-tight relation to the membrane, and
a non-permeable coating on all surfaces of the porous body not supporting the membrane or providing fluid communication between the porous body and the conduit.

2. An apparatus of claim 1 wherein the feed inlet and concentrate outlet are arranged so as to direct the flow of feed mixture uniformly over the membrane.

3. An apparatus of claim 1 wherein the shell contains an array of elements, said elements connected in fluid-tight relationship at their surfaces with porosity throughout for fluid flow.

4. An apparatus of claim 3 wherein the elements are in a parallel arrangement.

5. An apparatus of claim 3 wherein the elements are in a series arrangement.

6. An apparatus of claim 3 wherein the elements are in both series and parallel arrangement.

7. An apparatus of claim 1 wherein the porous body is covered by the membrane on all surfaces not providing fluid communication between the body and the conduit.

8. A reverse osmosis module for reducing the concentration of dissolved solids in a pressurized liquid by passing said liquid through a semi-permeable osmotic member, said module comprising:
a porous matrix formed of particulate material bonded together to produce a porous bar,
said bar having at least one longitudinal hole disposed therein,
a tubular shaped osmotic membrane disposed within said hole,
a tubular shaped enveloping membrane encompassing and tightly embracing said bar,
sealing means cooperating with said membranes to form a barrier completely surrounding said bar,
means in fluid communication with said matrix for draining off liquid which passes through said osmotic membrane,
a container enclosing said bar,
said bar being so disposed within said container that said membranes and said sealing means form a barrier which cooperates with said pressurized fluid in such a way that said pressurized fluid imparts only compressive forces to said matrix.

9. A reverse osmosis module as set forth in claim 8, wherein the bar has a plurality of holes disposed lengthwise therein, a tubular shaped osmotic membrane is disposed in each hole, and each hole is in direct fluid communication with said container.

10. A reverse osmosis module as set forth in claim 8, wherein the enveloping membrane is generally impervious to the liquid.

* * * * *